United States Patent Office 2,797,139
Patented June 25, 1957

2,797,139
METHOD OF INHIBITING EVAPORATION OF VOLATILE LIQUIDS AND FLOATING LAYER FOR USE THEREIN

Franklin Veatch, Lyndhurst, Ohio, assignor to The Standard Oil Company, Cleveland, Ohio, a corporation of Ohio No Drawing. Application October 30, 1953,
Serial No. 389,472

Claims priority, application Canada April 1, 1953

6 Claims. (Cl. 21—60.5)

The present invention relates to the inhibition of the evaporation loss of volatile products by a floating layer comprising small hollow hole-free particles.

Various industries have long been plagued with the problem of evaporation of products stored in tanks. Attempts to minimize this loss have resulted in various proposals, none of which have proved entirely satisfactory. In the petroleum industry, for example, the shape of the storage tanks, particularly the roofs of said tanks have been altered in an effort to reduce the evaporation loss but this has been only a partial solution due to the "breathing" effect with a change in temperature and upon filling and emptying the tank. Floating foams of myriad chemical compositions have been proposed, but with no appreciable reduction in evaporation loss, probably due to the short life of such foams. Furthermore, some of these chemical compositions have contaminated the stored products. This evaporation loss has proved exceedingly costly.

Accordingly, an object of this invention is the development of a permanent, inexpensive and effective method of substantially decreasing or inhibiting the evaporation loss from the surfaces of products containing volatile components.

This and other objects, as well as the utility and advantages of the invention will become apparent from the following detailed description.

It has now been found that the evaporation loss of volatile products can be effectively decreased and inhibited by floating thereon a layer comprising particles formed from film-forming materials which are hollow, predominantly hole-free, have a gas within and are very small. Each particle is a separate, unitary discrete entity. One method of preparing these hollow particles is described in copending application Serial No. 383,908, filed October 2, 1953, the disclosure of which (to the extent it describes the particles and method of making them) is incorporated by reference.

The method of preparing these hollow, gas-filled, predominantly hole-free particles, as described in said copending application, consists essentially in the steps of spraying a volatile vehicle containing a film-forming material capable of forming a tough gas-impermeable skin, and a gaseous substance or a gas-evolving substance, into a current of heated air whereby the vehicle is volatilized and the film-forming material is solidified in the form of hollow particles containing the evolved gas. The gas evolved during the drying is trapped within the particles and prevents the collapse of the film wall during drying or thereafter.

Gases per se utilizable in the above described process include carbon dioxide, methyl chloride, ammonia, dimethyl ether, ethylene oxide, methyl amine, methyl bromide, dimethyl amine, etc. Gas evolving substances, more commonly called blowing agents, are also utilizable in the instant process. Some of the well-known blowing agents operable herein include inorganic and organic salts of carbonates, nitrites, carbamates, oxalates, formates, benzoates, sulfites, bicarbonates, such as the sodium, ammonium, calcium and magnesium, salts thereof. Organic substances such as p-hydroxy phenylazides, di-N-nitrosopiperazines, polymethylene nitrosamines such as di-N-nitrosopentamethylene tetramine and trimethylene trinitrosamine, compounds containing two or more groups of the formula CON (alkyl) NO, such as succin-bis-(N-nitrosomethylamide) diazoaminobenzene, diazoisobutyric acid dinitrile and homologues thereof prepared using cyclohexanone or methyl ethyl ketone instead of acetone, can also be utilized in the aforedescribed method of preparing hollow, hole-free particles.

Many of the above blowing agents will react with other substances to produce gases instantaneously. Carbonates and sulfites, for example, such as sodium carbonate and sodium sulfite, react with acids such as hydrochloric or sulfuric to produce carbon dioxide and sulfur dioxide, respectively. Ammonium salts react with bases such as sodium hydroxide to liberate ammonia. Therefore, by feeding in hydrochloric acid solution to a solution of a film-forming material in accordance with the invention containing a carbonate or sulfite just as the solution is entering the atomizer, carbon dioxide or sulfur dioxide is liberated and is present during spray-drying as the gas necessary for forming hole-free hollow particles.

The amount of gas-forming substance required depends on the weight of the film-forming solution, the type and amount of gas evolved, and is usually within the range of about 0.1% to 25% by weight of the solution to be atomized.

The film-forming materials used may be organic or inorganic. The organic materials include cellulose derivatives such as cellulose acetate, cellulose acetate-butyrate, and cellulose acetate-propionate, thermoplastic synthetic resins, such as polyvinyl resins, i. e., polyvinyl alcohol, polyvinyl chloride, copolymers of vinyl chloride and vinyl acetate, polyvinyl butyral, polystyrene, polyvinylidene chloride, acrylic resins such as polymethyl methacrylate, polyallyl, polyethylene, and polyamide (nylon) resins, and thermosetting resins in the initial water- or organic solvent-soluble stage of partial polymerization, the resins being converted after or during formation of the particles into a more or less fully polymerized solvent-insoluble stage, such as alkyd, polysiloxane, phenolformaldehyde, ureaformaldehyde and melamine-formaldehyde resins. All of these resins are film-forming and therefore capable of forming tough-skinned particles during evaporation of droplets of solutions thereof in aqueous or organic solvents. Natural film-forming materials are also included within the scope of the form, including soybean protein, zein protein, alginates, and cellulose in solution as cellulose xanthate or cuprammonium cellulose. Inorganic film-forming substances include sodium silicates, polyborates and polyphosphates.

The solvent employed will, of course, be dictated by the solubility of the film-forming material used. The solvent should, upon evaporation, be conducive to solidification of the material, so that a tough skin is quickly formed over the surface of the droplet. Water, alcohols, ethers, esters, organic acids, hydrocarbons and chlorinated hydrocarbons, are the most noteworthy satisfactory solvents.

The concentration of the film-forming material solution is not critical, the lower limit being controlled by the size of the particle since the smallest particles are formed from dilute solutions, and the upper limit being set by the viscosity of the solution and by the maximum particle size desirable. Optimum results have been obtained with solutions containing from 1 to 15% film-forming material, although concentrations up to 30% have also been found satisfactory. Solutions as dilute as 0.1% have given satisfactory results. Aqueous solutions which contain from 1% to 10% polyvinyl alcohol (viscosity of a 4% aqueous solution at 20° C. is 4 to 28 cps. by the Hoeppler falling-ball method) or from 1% to 30%, preferably 5% to 20%, phenol-formaldehyde resin, are very satisfactory.

The solution is prepared, subdivided into droplets, and dried, by conventional means. The use of spray-drying equipment, in which the droplets are dried in a current of hot gas, usually air, is especially advantageous. The drying temperature is adjusted according to the stability and softening point of the film-forming material, the size of the droplets produced and the volatility of the solvent employed. However, as those skilled in the art appreciate, because of the cooling effect of evaporation, drying air of very high temperatures may be used without injury to low melting or easily decomposable materials. A high drying rate is very desirable; usually, air temperatures in the range of 80 to 700° F. will be adequate. Satisfactory drying conditions for individual cases are shown in the examples.

The dry particles that are produced in conventional spray drying equipment, employing solutions of the concentrations indicated above, are smaller than can be seen with the naked eye. Frequently their diameter is about ten times the thickness of the plastic skin surrounding their hollow interior, but these dimensions will depend upon the droplet size produced by the equipment used and the concentration of the film-forming material in the solution.

*Example I*

An aqueous solution of a water-soluble partially polymerized phenol-formaldehyde resin (Durez 15281) was prepared with a blowing agent. The composition contained 2½% of the resin, ½% of di - N - nitrosopentamethylenetetramine on an active basis, and 97% water. The composition was spray dried at the rate of 57 cc. per minute utilizing a laboratory spray drier. The drier operated at an inlet temperature of 680° F. and an outlet temperature of 445° F. The particles obtained have a bulk density of 0.013 gm./cc., and a liquid displacement of 0.070. The average size of the particles is 33.6 microns as determined with a Subsieve Sizer and the range of particle size as determined with a microscope is 5 to 60 microns. In order to determine if particles are hole-free, a weighed quantity of particles is floated in a bath of petroleum naphtha at room temperature and the percentage of the original sample which sinks after 24 hours is determined. In this particular example none of the particles sank.

*Example II*

Example I was repeated using 10% of the resin, 1% of the blowing agent and 89% water. The composition was spray dried on a semi-commercial apparatus at the rate of 1 lb. per hour with a drier inlet temperature of 530° F. and an outlet temperature of 425° F. The run was repeated except that the feed rate was increased to 3 lbs. per hour. Inasmuch as the particles obtained at the two different feed rates were not substantially different, the output of the two runs was combined. The particles had a bulk density of 0.098 gm./cc., a liquid displacement of 0.32, an average (Subsieve Sizer) size of 16 microns, and a microscopic range of 2 to 30 microns. In the flotation test approximately 4% of the particles sank in the naphtha.

*Example III*

A 10% solution of a phenol-formaldehyde resin (Durez 14798) in water containing 1% of ammonium carbonate as a blowing agent with 89% water was spray dried at a feed rate of 111 cc. per minute, with a drier operating at an inlet temperature of 700° F. and an outlet temperature of 400° F. In the flotation test only 3% of the particles sank after 24 hours. The particles had a liquid displacement density of 0.449, a bulk density of 0.16, and a size range (microscopic) of 2 to 30 microns.

*Example IV*

Example III was repeated except that ammonium nitrite was employed as the blowing agent. The particles had a liquid displacement density of 0.353, a bulk density of 0.09, and a microscopic size of 2 to 40 microns. Only 1% sank after twenty-four hours in the flotation test.

*Example V*

An aqueous solution of polyvinyl alcohol (Dupont "Elvanol" grade 70–05) in an amount of 5% was prepared with ½% ammonium carbonate as the blowing agent. The balance comprised water in the amount of 94.5%. This composition was spray dried at the feed rate of 80 cc. per minute, at an inlet temperature of 600° F. and an outlet temperature of 270° F. The particles had a liquid displacement density of 0.192, a bulk density of 0.07, and a microscopic size range of 5 to 50 microns. Only 2% sank in the flotation test.

*Example VI*

An aqueous 10% solution of sodium silicate was prepared containing 2½% (1% active) 40% dinitrosopentamethylenetetramine and 60% filler and the solution spray dried. The air temperature at the inlet was 700° F. and at the outlet 360° F., and the solution was fed in at a rate of 153.8 cc. per minute. The product had a dry bulk density of 0.236 grams per cc., and a liquid displacement of 0.580. The average particle size was 22.2 microns, as determined by a "subsieve sizer," and the range of particle size observed in the microscope from 5 to 40 microns.

Following the general description and the examples given heretofore, particles formed from urea-formaldehyde resin, polystyrene, and methyl cellulose were prepared having bulk densities within the range of 0.05 to 0.23, and an average particle size of 2.02 to 36.5 microns.

In addition to hollow particles made by the above described process, it is possible to utilize hollow particles made by other processes in which the wall of the particle can be formed of other materials. For example, the particles may be formed from a ceramic material, such as may be made by heating clay particles at a very high temperature or by the formation of hollow hole-free glass beads. These particles will float on a liquid and can be used alone or in combination with the particles described in greater detail heretofore.

The particles used in the invention include all such very small, hollow, predominantly hole-free particles of more or less spherical shape which will float on a liquid, irrespective of the material from which they are formed and the manner in which they are made as long as they are insoluble in and inert with respect to the materials with which they are in contact, and irrespective of the process by which they are made.

The preferred bulk density of the particles is within the range of 0.01 to 0.30 and the preferred liquid displacement density is within the range of 0.05 to 0.6 (gm./cc.) preferably 0.2 to 0.5. The bulk density is of interest when transporting or storing the particles. The liquid displacement density is of interest when the space between the particles is to be occupied by a liquid such as in a foam. The particles have an average diameter of 1 to 500 microns, generally 25 to 250 microns. Particles having the size range of less than 1 micron are entirely suitable but are more difficult to collect following the spray drying process.

It has been found that a floating layer of particles in themselves inhibits evaporation of volatile products.

It has also been found that this inhibition can be markedly improved by the presence of a sealing liquid in order to fill up the capillary interstices between the surfaces of the particles, which sealing liquid may be naturally contained in the volatile product, or may be separately added as an ingredient of the foam. The sealing liquid is held in place by capillary forces between the surfaces of the particles. The sealing liquid in effect is floated or held on top of the volatile product by the particles.

The sealing liquids, whether contained in the volatile product or added to the particles, must be non-volatile and inert to the particles. Preferably, sealing liquids should be non-corrosive and chemically stable. When an added sealing liquid is employed it should preferably be insoluble in the volatile product. These physical and chemical properties of sealing liquids are all characteristics which are known. Anyone can readily ascertain what liquids have these properties. The coaction between the particles and the sealing liquid does not involve any chemical reaction. One skilled in the art, in view of this disclosure, will be able to select liquids having suitable physical properties.

The amount of sealing liquid, when one is employed, that is desirable in the formation of the particle suspension is usually within the range of about 40 to 80% by volume of the suspension, 55 to 70% being preferred, depending of course on the nature and amount of particles and on the specific liquid used. If the amount is too small it will not fill the spaces between the particles. If it is too large, there will be more liquid than can fill the spaces between the particles and the excess will not be floated by the particles. The density of the mixture of the particles and the sealing liquid must be appreciably less than the density of the volatile product to be protected. Considering the average or combined density of the sealing liquid and the particles, it is possible to select the liquid and the proportions so that the mixture has a density less than that of the product to be covered, so that the mixture will float. If the product has a higher density, particles of a higher density can be used. The selection and the amount of the sealing liquid, and its physical coaction with the particles will be readily apparent to one skilled in the art in view of the disclosure herein.

Any suitable method of preparing this floating layer of particles may be employed. When a sealing liquid is not used or where it is naturally present in the volatile product, it is sufficient to place the particles on top of the product or mix them with it whereupon they will float to the top. When a separate sealing liquid is used, the simplest method consists in forming a suspension of the particles in the sealing liquid by suitable agitation. This suspension or slurry may then be pumped onto the surface of the product to be protected, where it forms a floating protective layer.

The particle content of the floating layer, when a sealing liquid is used, must be sufficient to impart buoyancy to the layer and usually constitutes from about 20 to 60%, and preferably 30 to 45% by volume thereof. The viscosity of the slurry must be sufficiently low to render it fluid enough for pumping or for other means of installation on the surface of the volatile product.

A floating layer of about ½ inch to 1 inch in thickness has been found to give adequate protection against evaporation and contamination, although a thickness as little as ⅛ inch gives some improvement. Greater thickness than 1 inch, while not inoperative, does not give sufficiently superior results to be justified economically. In general, it is not contemplated that a thickness in excess of 3 inches would be used.

The volatile products which may be protected in accordance with the invention are numerous. Included are volatile hydrocarbons such as gasoline, naphthas and other light fractions, including liquefied hydrocarbons such as liquid butane. Alcohols such as methyl, ethyl, and isopropyl alcohols are volatile and may have their evaporation reduced in accordance with the invention. Chlorinated hydrocarbons such as trichloroethylene may similarly be protected. Other low boiling liquefied gases such as chlorine, liquid oxygen or liquid nitrogen may be stored utilizing the invention. Aqueous solutions such as sugar solutions or electroplating solutions may be protected in accordance with the invention. Acetone and low boiling ketones and ethers may have their evaporation reduced by utilizing the invention.

The sealing liquid, if one is employed, may be selected in relation to the volatile product to be protected. If the volatile product naturally contains a sealing liquid, such as a non-volatile oil in a volatile hydrocarbon, the non-volatile oil will function as the sealing liquid. Where a separate sealing liquid is used such as in protecting a volatile hydrocarbon distillate, the glycols have proved particularly satisfactory, the specific glycol used being dependent on the nature of the substratum to be protected, such as hexylene glycol being particularly useful on crude oil tanks and dipropylene glycol being preferred on tanks storing gasoline and other light materials. Examples of other suitable sealing liquids include ethylene glycol, propylene glycol, polypropylene glycol, higher glycol polymers, polymers of olefin oxides such as ethylene and propylene oxides (available as Ucon oils), castor oil, Carbitol, Methylcellosolve, hexylene glycol (2-methyl-2,4-pentane diol), dimethyl phthalate, triethylene tetramine, tetraethylene pentamine, and polyvinyl methyl ether.

The alcohols, aqueous solutions and similar materials may be protected with a hydrocarbon oil such as white oil, which is substantially inert. Acetone and ethers and the liquefied gases may be protected with a perfluoro oil of the general formula $C_nF_{2n+2}$, where $n$ is an integer of 12 or more.

In selecting a separate sealing liquid it is desirable to employ one having a relatively high viscosity. This enhances the retention of the sealing liquid in the capillary interstices between the particles. If the sealing liquid has too low a viscosity there is a tendency for the buoyant action of the particles to squeeze the sealing liquid out of the capillary spaces. This tends to form a crust at the top, rendering re-sealing more difficult if the floating foam layer is broken. On the other hand, the viscosity should not be too high or the foam will become so heavy and viscous as to be relatively immobile, rendering it difficult to spread over the surface and secure an effective seal. The choice of sealing liquids and viscosities thereof will be obvious from the disclosure herein and the specific examples, depending upon the size and buoyancy of the particles, the substratum to be sealed, the length of life desired in the foam, and other factors apparent to one skilled in the art from the disclosure herein. When a separate sealing liquid is employed, hollow particles of small size, such as under 75 microns, are preferred.

The following specific examples are illustrative of foams that may be employed in practicing the invention.

*Example VII*

A floating layer of particles made in accordance with Example I, two inches thick, was floated on liquid butane, and the evaporation was substantially reduced. This contains no natural or added sealing liquid.

*Example VIII*

A floating layer of particles made in accordance with Example I was applied in a layer one inch thick on a wide cut catalytic cracker feed stock boiling between 150° and 800° F. The heavier components in this stock accumulate in the space between the particles and form a sealing liquid which is naturally present in the volatile product.

*Example IX*

A floating layer especially adapted for use on gasoline is as follows:

| | Percent by volume |
|---|---|
| Particles (formed from phenolformaldehyde resin, liquid displacement density: 0.070) | 41.5 |
| Sealing liquid (composed of 70% dipropylene glycol and 30% high viscosity polymeric olefin oxide (Ucon oil 75-H-90,000) | 58.5 |

Example X

A floating layer especially adapted for cut-back asphalt is as follows:

| | Percent by volume |
|---|---|
| Particles (formed from polyvinyl alcohol, liquid displacement density: 0.19) | 28.2 |
| Sealing liquid (castor oil) | 71.8 |

Example XI

A sealing liquid for use on gasoline has the following composition:

| | Percent by volume |
|---|---|
| Particles (formed from ureaformaldehyde, liquid displacement density: 0.35) | 46.7 |
| Sealing liquid (polyvinyl methyl ether) | 53.3 |

Example XII

| | Percent by volume |
|---|---|
| Particles (formed from phenolformaldehyde, liquid displacement density: 0.2) | 40 |
| Sealing liquid (heavy medicinal white oil "Nujol") | 60 |

This composition is especially adapted for use on alcohols and aqueous solutions.

Example XIII

| | Percent by volume |
|---|---|
| Particles (formed from urea formaldehyde resin, liquid displacement density: 0.15) | 35 |
| Perfluoro oil ($C_{18}F_{38}$, viscosity about 60 millipoises and essentially nonvolatile at 100° C.) | 65 |

This composition is useful on chlorinated hydrocarbons, chemicals such as ketones, and ethers in which the particles are insoluble.

Other agents may be added to the floating layer to impart specific properties thereto without adversely affecting its unusual and superior property of inhibiting or decreasing the evaporation loss from storage tanks containing nonvolatile products, such as rust inhibitors, fire-resistant agents, anti-bleeding agents, etc.

While the invention has been described with reference to specific embodiments, it will be apparent to those skilled in the art that various modifications may be made and equivalents substituted therefor without departing from the principles and true nature of the present invention.

This application is a continuation-in-part of copending application Serial No. 281,272, filed April 8, 1952 (now abandoned).

I claim:

1. The method of inhibiting the evaporation of volatile liquid products which comprises covering the surface of said volatile liquid product with a floating layer of discrete, spherical, hollow, gas-filled, hole-free particles wettable by said volatile liquid product and having an average diameter of less than 500 microns of a solid material inert to said volatile liquid product, which particles have a liquid displacement density of from 0.05 to 0.6.

2. The method of claim 1 in which the volatile liquid product is a volatile liquid petroleum product.

3. The method of claim 2 in which the volatile liquid product is gasoline, said particles having an average diameter of 25 to 250 microns and a liquid displacement density of from 0.2 to 0.5.

4. The method of inhibiting the evaporation of a volatile liquid product which comprises covering the surface of said volatile liquid product with a floating layer containing as the essential ingredients a non-volatile, oil-insoluble sealing liquid having a density greater than the density of said volatile liquid product, and discrete, spherical, hollow, gas-filled, hole-free particles wettable by said sealing liquid and having an average diameter of less than 500 microns of a solid material inert to said petroleum product and said sealing liquid, the sealing liquid in said floating layer being an amount within the range of 40 to 80% by volume and the particles in said floating layer being in an amount within the range of 20 to 60% by volume, said particles having a liquid displacement density of from 0.05 to 0.6, and the sealing liquid having a density not greater than that which imparts to a floating layer having proportions of particles and sealing liquid in the above ranges a density less than that of the volatile liquid product.

5. The method of claim 4 in which the volatile liquid product is gasoline and the sealing liquid is dipropylene glycol.

6. A composition adapted to cover a volatile liquid product and float thereon to inhibit the evaporation thereof containing as the essential ingredients a non-volatile, oil-insoluble sealing liquid having a density greater than the density of said volatile liquid product, and discrete, spherical, hollow, gas-filled, hole-free particles wettable by said sealing liquid and having an average diameter of less than 500 microns of a solid material inert to said volatile liquid product and said sealing liquid, the sealing liquid in said composition being an amount within the range of 40 to 80% by volume and the particles in said composition being in an amount within the range of 20 to 60% by volume, said particles having a liquid displacement density of from 0.05 to 0.6, and the sealing liquid having a density not greater than that which imparts to said composition having a proportion of particles and sealing liquid in the above range a density less than that of the volatile liquid product to which the composition is to be applied.

References Cited in the file of this patent

UNITED STATES PATENTS

| | | |
|---|---|---|
| 1,394,060 | Bates | Oct. 18, 1921 |
| 1,415,351 | Howard et al. | May 9, 1922 |
| 1,415,352 | Howard et al. | May 9, 1922 |
| 1,479,790 | Davis | Jan. 8, 1924 |
| 1,985,491 | Fisher | Dec. 25, 1934 |

OTHER REFERENCES

De Ment: Abstract of application Serial No. 301, published June 30, 1953, 671 O. G. 1497.